United States Patent
Affret et al.

(10) Patent No.: US 10,471,835 B2
(45) Date of Patent: Nov. 12, 2019

(54) ASSISTANCE SYSTEM AND METHOD FOR THE POSITIONING OF AN ELECTRIC VEHICLE RELATIVE TO A CHARGING STATION, CHARGING STATION AND ELECTRIC VEHICLE IMPLEMENTING SAID METHOD

(71) Applicant: BLUETRAM, Puteaux (FR)

(72) Inventors: Nicolas Affret, Quimper (FR); Marc Derrien, Concarneau (FR)

(73) Assignee: BLUETRAM, Puteaux (FR)

( * ) Notice: Subject to any disclaimer, the term of this patent is extended or adjusted under 35 U.S.C. 154(b) by 19 days.

(21) Appl. No.: 15/515,704

(22) PCT Filed: Aug. 18, 2015

(86) PCT No.: PCT/EP2015/068952
§ 371 (c)(1),
(2) Date: Mar. 30, 2017

(87) PCT Pub. No.: WO2016/050410
PCT Pub. Date: Apr. 7, 2016

(65) Prior Publication Data
US 2017/0305287 A1    Oct. 26, 2017

(30) Foreign Application Priority Data

Sep. 30, 2014 (FR) ..................... 14 59305

(51) Int. Cl.
*B60L 11/18* (2006.01)
*H02J 50/90* (2016.01)
(Continued)

(52) U.S. Cl.
CPC .......... *B60L 11/1833* (2013.01); *B60L 53/14* (2019.02); *B60L 53/16* (2019.02); *B60L 53/30* (2019.02);
(Continued)

(58) Field of Classification Search
CPC ............. B60L 11/1833; B60L 11/1816; B60L 11/1825; B60L 11/1838; B60L 2240/80;
(Continued)

(56) References Cited

U.S. PATENT DOCUMENTS 5,272,431 A   12/1993  Nee
8,324,858 B2  12/2012  Hill et al.
(Continued)

OTHER PUBLICATIONS

International Search Report from International Patent Application No. PCT/EP2015/068952, dated Nov. 24, 2015.
(Continued)

*Primary Examiner* — Hussein Elchanti
(74) *Attorney, Agent, or Firm* — Greer, Burns & Crain, Ltd.

(57) ABSTRACT

A method for assisting the positioning of an electric vehicle, provided with energy storage structure, with respect to a recharging station the electric vehicle and the recharging station being arranged in order to form between them a temporary electromechanical coupling allowing a transfer of electrical energy from the recharging station to the storage structure. This method includes, at the level of the recharging station, a phase of detecting a positioning of the electric vehicle that is suitable for a temporary coupling, and at the level of the vehicle, a phase of transmitting a charging command to the station, processing the charging command by the station being conditional on the detection of the positioning and controlling the forming of a temporary coupling, then a transfer of energy.

18 Claims, 3 Drawing Sheets

(51) Int. Cl.
  *H02J 50/10* (2016.01)
  *H02J 7/00* (2006.01)
  *H02J 7/02* (2016.01)
  *B60L 53/14* (2019.01)
  *B60L 53/16* (2019.01)
  *B60L 53/30* (2019.01)
  *B60L 53/31* (2019.01)
  *B60L 53/36* (2019.01)
  *B60L 53/37* (2019.01)
  *B60L 53/60* (2019.01)
  *H01M 2/30* (2006.01)

(52) U.S. Cl.
  CPC ............... *B60L 53/31* (2019.02); *B60L 53/36* (2019.02); *B60L 53/37* (2019.02); *B60L 53/60* (2019.02); *H02J 7/0021* (2013.01); *H02J 7/025* (2013.01); *H02J 50/10* (2016.02); *H02J 50/90* (2016.02); *B60L 2200/18* (2013.01); *B60L 2240/80* (2013.01); *B60L 2250/00* (2013.01); *H01M 2/30* (2013.01); *H02J 2007/0001* (2013.01); *Y02T 10/7005* (2013.01); *Y02T 10/7072* (2013.01); *Y02T 90/121* (2013.01); *Y02T 90/125* (2013.01); *Y02T 90/128* (2013.01); *Y02T 90/14* (2013.01); *Y02T 90/163* (2013.01)

(58) Field of Classification Search
  CPC ....... B60L 2250/00; H02J 50/90; H02J 50/10; H02J 7/0021; H02J 7/025; H02J 2007/0001
  See application file for complete search history.

(56) References Cited

U.S. PATENT DOCUMENTS

| | | | |
|---|---|---|---|
| 8,346,423 B2 * | 1/2013 | Crombez | B60K 28/10 701/22 |
| 8,400,106 B2 | 3/2013 | Midrouillet et al. | |
| 8,636,527 B2 | 1/2014 | Hengel et al. | |
| 2004/0073440 A1 * | 4/2004 | Garbers | G06Q 10/02 705/5 |
| 2008/0275600 A1 * | 11/2008 | Rask | B60K 6/24 701/22 |
| 2009/0024267 A1 * | 1/2009 | Kawai | B60K 6/365 701/22 |
| 2009/0079388 A1 | 3/2009 | Reddy | |
| 2010/0120581 A1 * | 5/2010 | Mitsutani | B60L 3/0046 477/7 |
| 2011/0022256 A1 * | 1/2011 | Asada | B60L 11/1824 701/22 |
| 2011/0156644 A1 * | 6/2011 | Arai | B60L 3/0046 320/109 |
| 2011/0266996 A1 * | 11/2011 | Sugano | B60L 3/003 320/104 |
| 2012/0187773 A1 * | 7/2012 | Wechlin | B60L 11/182 307/104 |
| 2013/0197803 A1 | 8/2013 | Park et al. | |
| 2014/0009112 A1 | 1/2014 | Fontana et al. | |
| 2014/0084859 A1 | 3/2014 | Hall et al. | |
| 2014/0176070 A1 | 6/2014 | Krammer | |
| 2014/0225433 A1 * | 8/2014 | Niizuma | B60L 7/14 307/10.1 |

OTHER PUBLICATIONS

Written Opinion from International Patent Application No. PCT/EP2015/068952, dated Nov. 24, 2015.

\* cited by examiner

ASSISTANCE SYSTEM AND METHOD FOR THE POSITIONING OF AN ELECTRIC VEHICLE RELATIVE TO A CHARGING STATION, CHARGING STATION AND ELECTRIC VEHICLE IMPLEMENTING SAID METHOD

BACKGROUND

The present invention relates to a method and system for assisting the positioning of an electric vehicle with respect to a recharging station. It also relates to a recharging station and an electric vehicle implementing this method.

The electric vehicles concerned can be of the guided type or not, such as a tram or a bus, or also individual mobility systems for personal or shared use.

Electric vehicles require on-board storage of electrical energy for supplying their electric drive train. Recharging the on-board energy storage systems means that these systems receive electrical energy from a recharging station. Among the energy transfer techniques that are currently available, those utilizing electromechanical coupling systems are known.

Document EP 1 938 438 discloses the principle of an arm arranged on the roof of a bus/tram and intended to connect to a socket equipping the station in order to carry out charging.

A connecting system for recharging is also known from document EP 2 393 165, utilizing various concentric tubes that are disengaged on entering the entry cone so as to allow only the plug at the base of the entry cone to come out.

All these electromechanical coupling and terminal devices involve controlling the positioning of the vehicle to be recharged with respect to the recharging station. Several mechanical solutions are already known aiming to optimize the positioning of a vehicle with respect to a station. There can be mentioned in particular the documents U.S. Pat. No. 8,324,858, US 2013/0197803 and US 2014/0084859.

However, the technical solutions proposed and disclosed in these documents are complex to implement and expensive. In particular, they involve substantial investment, as they require modifications to existing infrastructure.

SUMMARY

The purpose of the present invention is to overcome the difficulties currently encountered, by proposing a method for assisting the positioning of an electric vehicle provided with energy storage means with respect to a recharging station, the electric vehicle and the recharging station being arranged in order to form a temporary electromechanical coupling between them allowing a transfer of electrical energy from the recharging station to the storage means.

According to the invention, this method comprises, at the recharging station, a phase of detecting a positioning of the electric vehicle that is suitable for a temporary coupling, and at the level of the vehicle, a phase of transmitting a charging command to the station, processing the charging command by the station being conditional on the detection of the positioning and controlling a temporary coupling being formed, then a transfer of energy.

More particularly, an assistance method according to the invention is proposed, in which, with the recharging station comprising a device for supplying electrical energy equipped with first electromechanical coupling means and means for actuating the first coupling means, and the electric vehicle comprising a device for receiving electrical energy equipped with second electromechanical coupling means, the first and second means are arranged in order to be coupled in such a way as to obtain a transfer of electrical energy from the recharging station to the electric vehicle.

According to the invention, this particular embodiment of the method comprises, from the recharging station, detecting the immobilization of said electric vehicle substantially in a predetermined spatial position with respect to the recharging station, the detection allowing a charging control signal transmitted from the electric vehicle to be received, the charging control signal thus received then being processed so as to generate a connection command applied to said actuation means.

The recharging station is arranged in order to allow: (i) immobilization of said electric vehicle substantially in a predetermined spatial position with respect to the recharging station, (ii) a command, called connection command, of the actuation means, so that the first coupling means enter into electromechanical connection with the second coupling means, (iii) a command, called disconnection command, of the actuation means so that the first coupling means disconnect from the second coupling means.

Thus, with the present invention, a robust, reliable, cost-effective system is available that is easy to install in an existing infrastructure.

The method according to the invention can also advantageously comprise detecting the end of charging of the electric vehicle, the detection allowing a driving command signal to be received; the driving command signal thus received then being processed so as to generate the disconnection command.

In an advantageous version of the invention, the method can also comprise detecting the end of travel of the first coupling means during disconnection; detection of the end of travel authorizing the electric vehicle to move.

In a preferred version of the invention, the method can also comprise signalling of authorizing or not authorizing driving of the electric vehicle with respect to the recharging station, this signalling being changed as a function of the detections of immobilization, of end of charging and of end of travel.

The method according to the invention can also advantageously comprise monitoring the driving of the electric vehicle, as a function of the detections of immobilization, of end of charging and of end of travel.

According to another aspect of the invention, a system is proposed for assisting the positioning of an electric vehicle provided with energy storage means with respect to a recharging station, for the implementation of the assistance method according to the invention, the electric vehicle and the recharging station being arranged in order to form between them a temporary electromechanical coupling allowing a transfer of electrical energy from the recharging station to the storage means.

According to the invention, the assistance system comprises:
at the level of the recharging station,
  means for detecting a positioning of the electric vehicle suitable for a temporary coupling,
  means for commanding a temporary electromechanical coupling, and
  means for commanding a transfer of energy from the station to the vehicle, and
at the level of the vehicle,
  means for transmitting a charging command to the station, the implementation of the means for commanding a temporary electromechanical coupling and means for transferring energy being conditional on the detection of positioning.

In a particular embodiment of the invention, an assistance method is proposed, for which the recharging station comprises a device for supplying electrical energy equipped with first electromechanical coupling means and means for actuating the first coupling means, and the electric vehicle comprises a device for receiving electrical energy equipped with second electromechanical coupling means, the first and second means being arranged in order to be capable of being coupled in such a way as to obtain a transfer of electrical energy from the recharging station to the electric vehicle.

According to this particular embodiment of the invention, the assistance system comprises, within the recharging station, means for detecting immobilization of said electric vehicle substantially in a predetermined spatial position with respect to the recharging station and transmitting an immobilization information, means for receiving a charging command signal transmitted from the electric vehicle, and means for processing said immobilization information and the charging command signal thus received, so as to generate a connection command applied to the actuation means.

The assistance system according to the invention can also advantageously comprise means for receiving an end of charging information of the electric vehicle, means for receiving a driving command signal transmitted from the electric vehicle, and means for processing the driving command signal thus received, so as to generate a disconnection command applied to the actuation means.

Provision can also be made for an assistance system according to the invention further comprising means for detecting an end of travel of the first coupling means during disconnection, the detection of end of travel authorizing the electric vehicle to move.

The assistance system according to the invention can also comprise means for signalling authorizing or not authorizing driving of the electric vehicle with respect to the recharging station, these signalling means being connected to the means for processing the immobilization, end of charging and end of travel information.

According to yet another aspect of the invention, a station is proposed for the recharging of an electric vehicle, comprising a device for supplying electrical energy equipped with first electromechanical coupling means and means for actuating the first coupling means, the electric vehicle comprising a device for receiving electrical energy equipped with second electromechanical coupling means, the first and second coupling means being arranged in order to be coupled in such a way as to obtain a transfer of electrical energy from the recharging station to the electric vehicle.

According to this yet further aspect of the invention, the recharging station comprises means for detecting immobilization of said electric vehicle with respect to the recharging station, means for receiving a charging command signal transmitted from the electric vehicle, and means for processing the charging command signal, so as to control the actuation means of the first coupling means, subject to immobilization, until the first coupling means enter into connection with the second coupling means.

The recharging station is thus arranged in order to allow:
i) immobilization of said electric vehicle substantially in a predetermined spatial position with respect to the recharging station,
ii) a command, called connection command, of the actuation means, so that the first coupling means enter into electromechanical connection with the second coupling means,
iii) a command, called disconnection command, of the actuation means, so that the first coupling means are disconnected from the second coupling means, The recharging station according to the invention can also advantageously comprise means for receiving an end of charging signal transmitted by transmission means within the electric vehicle, and means for processing the end of charging signal, so as to control the disconnection of the first coupling means until an end of travel of the first coupling means is detected, transmitted by the end of travel detection means.

Provision can also be made for the recharging station to further comprise means for signalling authorizing or not authorizing driving of the electric vehicle with respect to the recharging station, these signalling means being connected to the means for processing the immobilization, end of charging and end of travel information.

According to yet another aspect of the invention, an electric vehicle is proposed, provided to be recharged with electrical energy from a recharging station according to the invention, the recharging station comprising a device for supplying electrical energy equipped with first electromechanical coupling means and means for actuating the first coupling means, the electric vehicle comprising a device for receiving electrical energy equipped with second electromechanical coupling means, the first and second coupling means being arranged in order to be capable of being coupled in such a way as to obtain a transfer of electrical energy from the recharging station to the electric vehicle.

According to the invention, this vehicle is characterized in that it also comprises means for transmitting a charging command to the charging station, means for detecting an end of charging and generating an end of charging information, means for transmitting said end of charging information to the recharging station, and means for transmitting a driving command to the recharging station.

This electric vehicle according to the invention can also advantageously comprise moveable means for detecting immobilization of said electric vehicle substantially in a predetermined spatial position with respect to the recharging station, the moveable means for detecting immobilization cooperating with static means for detecting immobilization connected to the recharging station so as to generate an immobilization information.

Provision can also be made for the moveable means for detecting immobilization to comprise a retro-reflector provided in order to receive and reflect a light beam emitted by a photoelectric cell equipping the static means for detecting immobilization, the retro-reflector and the photoelectric cell being placed respectively on or in said electric vehicle and on the recharging station in such a way as to obtain a longitudinal detection of immobilization substantially in a predetermined longitudinal position.

In a particularly beneficial embodiment of the invention, the vehicle can also comprise a driver's position provided with a human-machine interface incorporating in particular the respective charging and driving commands, the respective status of these commands, and the respective immobilization and end of charging information.

This vehicle according to the invention can also comprise means for receiving an end-of-travel information of the first coupling means, and means for blocking the driving of said electric vehicle on station until said end of travel information has been received. The human-machine interface can also incorporate the end of travel information.

In a particular version of the invention, the electric vehicle according to the invention can also comprise means for detecting a presence of the first coupling means close to the second coupling means, and means for blocking the driving of said electric vehicle on station in response to detection by the presence detection means.

The human-machine interface can also incorporate the presence detection information.

The second electromechanical coupling means can advantageously comprise a female coupling entry cone, oriented substantially laterally with respect to the longitudinal axis of said electric vehicle and arranged in order to receive a male coupling part placed at the end of the first electromechanical coupling means connected to the recharging station.

A system for assistance with positioning is thus made available that is secure, since the entry cone of the arm on the roof of the electric vehicle has a wider tolerance than that of the retro-reflector.

BRIEF DESCRIPTION OF THE DRAWINGS

Possible embodiments of the present invention will now be described, with reference to the figures set out below.

DETAILED DESCRIPTION

As these embodiments are in no way limitative, variants of the invention can be envisaged that comprise only a selection of the characteristics described below in isolation from the other characteristics described, (even if this selection is isolated within a sentence comprising these other characteristics) if this selection of characteristics is sufficient to confer a technical advantage or to differentiate the invention from the prior art. This selection comprises at least one preferably functional characteristic without structural details, or with only a part of the structural details if this part alone is sufficient to confer a technical advantage or to distinguish the invention with respect to the prior art.

Figure 1:
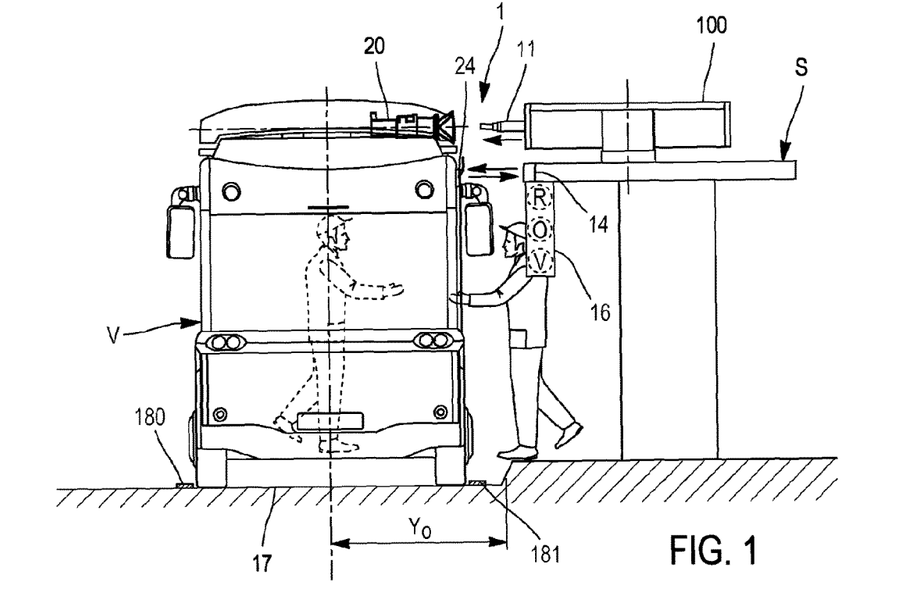
FIG. 1 is a rear view of an electric vehicle positioned in front of a recharging station according to the invention.
Figure 2:
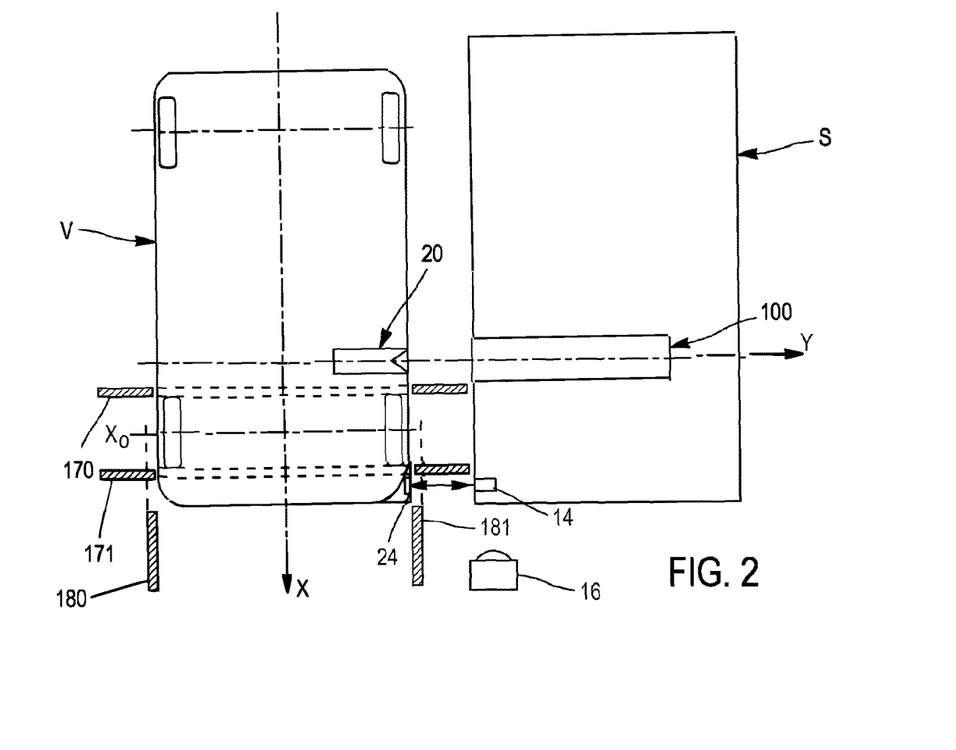
FIG. 2 is a bottom view of the electric vehicle and of the recharging station in FIG. 1.

With reference to FIGS. 1 and 2, an electric vehicle V, for example of the electric bus or tram type, arrives at a station S equipped with a recharging function. The electric vehicle V is equipped on its upper part with an electromechanical coupling device 20, of female type, provided in order to receive electrical energy that will be stored in an on-board storage unit (not shown in these figures). The vehicle shown in FIGS. 1 and 2 corresponds to a conduit on the left, but it is important to note that the present invention is not limited to this configuration and can equally well be implemented for pipes on the left or right.

The electric vehicle V is moreover equipped, on its lateral part with respect to the station S, with a retro-reflector 24 intended to reflect a detection light beam.

The recharging station S comprises on its upper part a device 100 for actuating a moveable electromechanical coupling part 11, of male type, provided in order to be coupled to the coupling device 20 firmly fixed to the electric vehicle V.

For a detailed description of a practical embodiment of the electromechanical coupling system implemented in the example currently described, reference may usefully be made to the teaching of document EP 2 393 165.

The station S is also equipped with a signalling system 16 with three-colour lights placed in order to be visible to the driver of the electric vehicle V, and a photoelectric cell 14 provided in order to detect the positioning of the vehicle V.

An essential condition in order to allow the charging process is for the vehicle V to be suitably positioned with respect to the station A, both longitudinally (axis X) and laterally (axis Y). In order to ensure lateral positioning, the roadway 17 running next to the station S can be provided with two parallel strips 180, 181 allowing the driver to correctly position his vehicle V in a predetermined lateral position Yo.

For the longitudinal positioning, a reference mark can be provided on the pavement bordering the station S. The driver of the vehicle V gauges the position of this reference mark with respect to the centre of the front wheel, by means of a wing mirror. Provision can also be made for the use of a camera or a lens placed on a side window of the vehicle.

Two transverse strips 170, 171 can also be provided on the roadway 17 so as to assist the driver of the vehicle V in his longitudinal positioning by placing the front wheels of the vehicle V between these two transverse strips (FIG. 2).

The roadway 17 can thus be equipped:
with painted reference marks in order to assist in aligning the vehicle laterally along Y,
physical blocks allowing the driver to feel the correct longitudinal positioning of the vehicle along X.

It should be noted that the positioning tolerance along X is progressive:
visual reference mark: approximately +/−50 mm.
optical sensor: +/−80 mm.
coupling cone: +/−100 mm.

This progressive tolerance normally precludes incorrect positioning along X.

When the retro-reflector 24 reflects the light beam emitted by the photoelectric cell 14, the optimum longitudinal positioning Xo has been reached.

Figure 3:
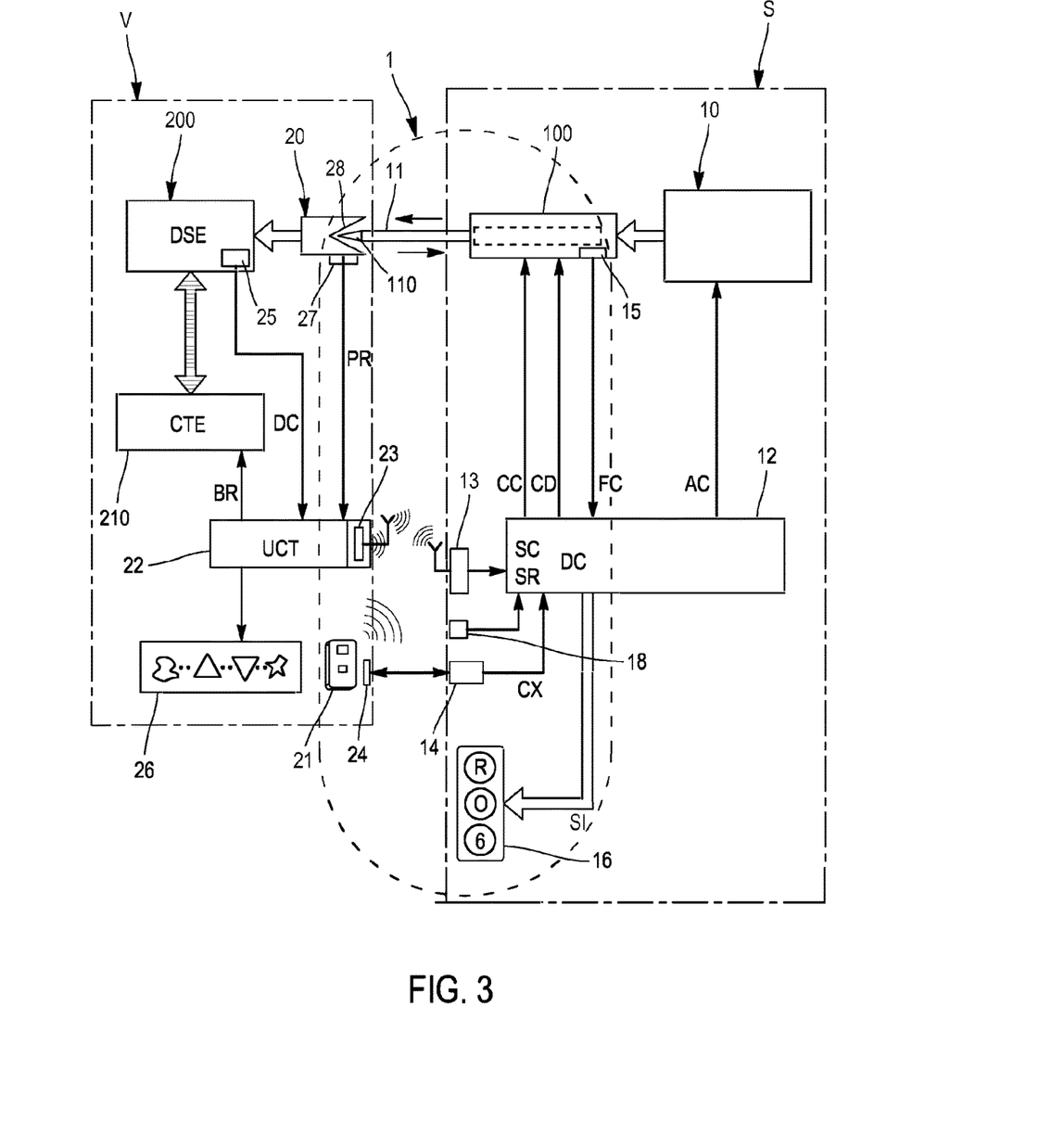
FIG. 3 is a block diagram of a system for assisting positioning according to the invention within an electric vehicle and a recharging station according to the invention.

With reference to FIG. 3, the positioning assistance system 1 according to the invention is distributed between the vehicle V and the recharging station S.

Thus, the vehicle V comprises, in the context of this assistance, apart from the retro-reflector 24, a wireless transmitter-receiver unit 23 for communicating with the station S, a unit 27 for detecting the presence of the male moveable coupling part 110 close to a receiving cone 28 of the coupling device 20, a unit 25 for detecting the end of charging associated with an energy storage device (DSE) 200, a remote control 21 that can be actuated by the driver in order to command charging and in order to command driving, and a human-machine interface 26 provided within the driver's position of the vehicle V.

The station S comprises, by way of assistance system 1 according to the invention, apart from the signalling system 16 and the photoelectric cell 14, a unit 15 for detecting the end of travel associated with the actuation device 100, a wireless transmitter-receiver unit 13 for communicating with the vehicle V, and an infra-red receiver unit 18 provided in order to receive infra-red signals originating from a remote control.

Functionally, the vehicle V comprises an electric drive train (CTE) 210 connected to the energy storage device 200 with which transfers of energy are carried out, and a control and processing unit (UTC) 22 receiving a DC end of charging signal from the end of charging detection unit 25, a detection of presence signal PR originating from the presence detection unit 27, and en end of travel signal FC transmitted from the station S via the transmitter-receiver units 13, 23. It should be noted that provision can also be made, within the framework of the present invention, for a station that does not emit signals. The control and processing unit equipping the vehicle then only processes signals produced by on-board equipment or transmitted by remote communication systems.

Provision can be made for the control and processing unit 22 to generate graphical information, such as icons, representing information of interest for the positioning and charging operations, and configured in order to be displayed on the human-machine interface 26, and a signal BR of blocking the driving of the electric drive train 210.

Functionally, the station S comprises, apart from the electrical energy supply device 10, the actuation device 100 and the signalling system 16, a control and processing unit 12 receiving at input:

- the longitudinal signal of immobilization CX emitted by the photoelectric cell 14,
- the charging command SC and driving SR signals originating, via the infrared receiver unit 18, from the remote control 21 that can be operated by the driver of the vehicle V,
- the end of charging detection signal DC originating from the energy storage device 200 via the wireless transmitter-receiver channel 13, 23 established between the station S and the vehicle V, and
- the end of travel signal FC of the moveable part of the coupling 11 after return within the actuation device 100, originating from the end of travel detection unit 15.

The control and processing unit 12 is provided to generate, in response to the processing of the aforementioned signals:

- a charging command signal CC to the actuation device 100, for controlling the deployment of the moveable part of the coupling 11,
- a disconnection command signal CD to the actuation device 100, for controlling disconnection of the moveable part of the coupling 11, and
- a signal AC actuating the energy supply device 10, when the electromechanical coupling has been correctly put in place and the control and processing unit 12 of the station has correctly received a charging command from the vehicle V.

Provision can also be made to integrate the automatic withdrawal of the moveable coupling arm at the end of charging. This ensures safe operation, as there is no waiting time between the action of the driver and complete withdrawal of the arm. This waiting was not natural, and possibly variable. The driver therefore waits for the light signal, conditional on the end of travel of the arm.

Figure 4:
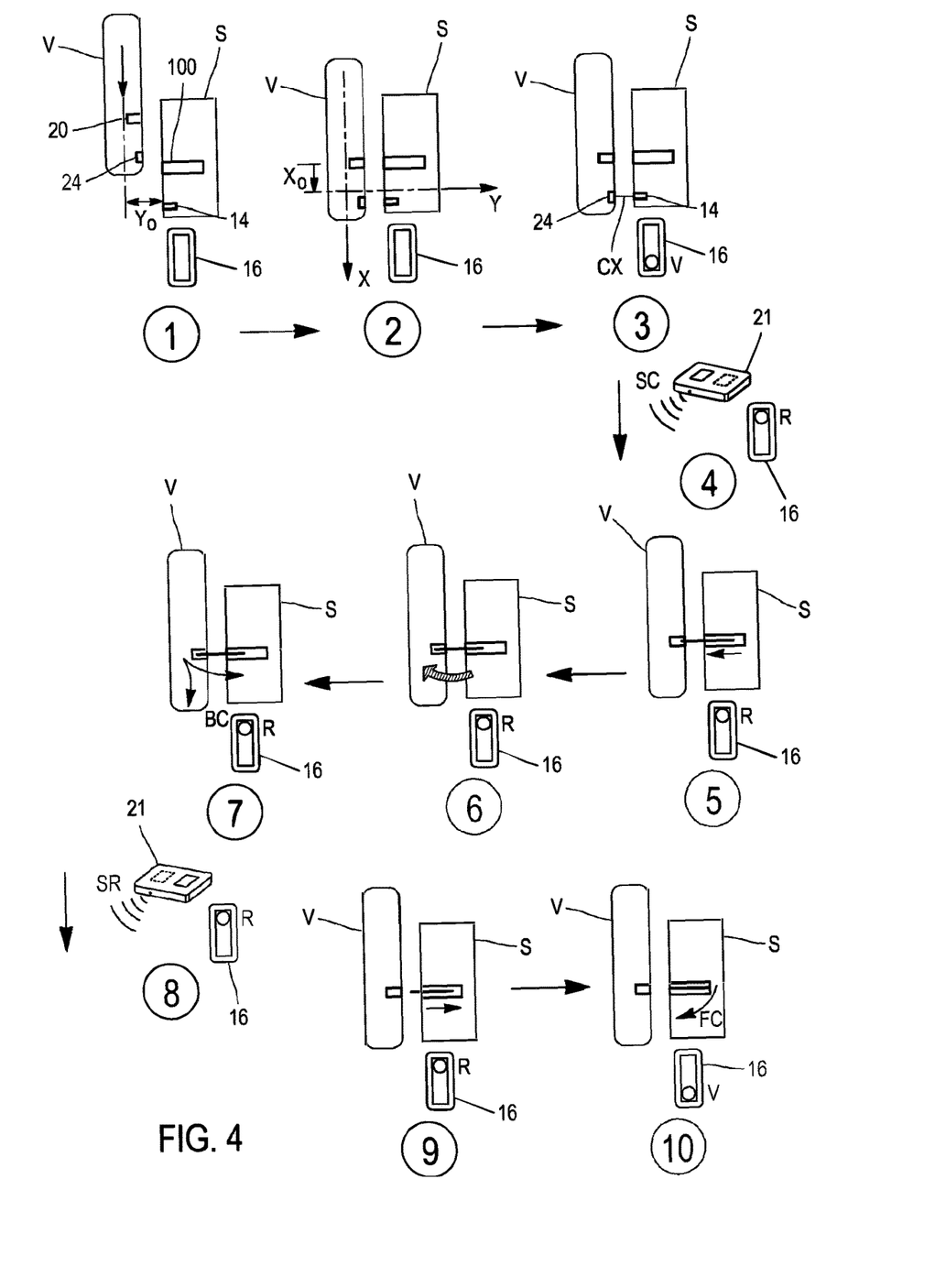
FIG. 4 shows the various steps of a recharging process of an electric vehicle according to the invention, implementing the positioning assistance method according to the invention.

Various steps of the assistance method according to the invention will now be described, with reference to FIG. 4 and the aforementioned figures, at the same time as the functional relationships between the different units and components of the station and of the vehicle. The table below summarizes the different situations encountered, the associated codes for the signal lights and their interpretation for the driver of the vehicle.

The general rules for controlling the signal lights are the following:

- all the station warnings are shown as flashing orange,
- the flashing orange is switched off in the case of the absence of a vehicle,
- the flashing orange is activated in the case of a station alarm that persists even after cancellation by the driver's remote control,
- the light is red until the arm has been completely retracted.

Station signal light code

| SITUATION | LIGHT | DRIVER INTERPRETATION |
|---|---|---|
| Station OK Vehicle absent | OFF | Permission to enter or leave station |
| Vehicle detected Station ready for charging/ discharging request | STEADY GREEN | Permission to make a charging/ discharging request |
| Movement of arm in progress Charging/discharging in progress | STEADY RED | Entry to station not permitted If already on station, driving not permitted |
| Charging finished Arm retracted Vehicle in position | STEADY GREEN | Permission to leave the station |
| Station fault, service call required | FLASHING ORANGE | Station faulty Recharging not possible Entry permitted to drop off passengers |
| Vehicle in position Station fault, service call required | STEADY GREEN + FLASHING ORANGE | Station faulty Recharging not possible Permission to leave the station |
| Station fault, service call required and/or The arm is not fully retracted and/or Electrical risk in station | STEADY RED + FLASHING ORANGE | Station faulty Recharging not possible Entry forbidden (safety risk) |

In a phase 1, the vehicle V is approaching the station S. The driver positions his vehicle laterally in such a way as to obtain a suitable lateral position Yo with respect to the station S. The signalling system 16 is off, indicating to the driver that he can still move on the roadway 17.

In phase 2, the vehicle V approaches its optimal longitudinal position Xo, the driver being assisted by the visual marker, by using the wing mirror. When the retro-reflector 24 is opposite the photoelectric cell 14 (phase 3), the latter emits a signal CX of detection of immobilization X that is processed by the control and processing unit of the station S with a resulting change in the signalling displayed on the signalling system 16, which changes to a flashing green. The driver is thus alerted that the suitable position has been correctly reached, and that he can stop his vehicle.

The driver can then actuate (phase 4) the charging command button of his remote control 21. The infra-red charging command signal SC is then received by the infra-red receiver unit 18 and processed by the control and processing unit 12 which generates in return a charging command signal CC to the actuation device 100. This has the effect of initiating the lateral deployment of the moveable coupling arm 11 which will be engaged in the connection cone 28 of the coupling device 20 of the vehicle V. From the start of this deployment phase 5 and the start of movement of the arm, the signalling system changes to red and will remain red throughout the charging phase that will follow and until the complete withdrawal of the arm.

When the end 110 of the moveable coupling arm 11 is correctly engaged in the receiving cone 28, the electrical connection is made and the transfer of electrical energy from the station S to the energy storage device 200 of the vehicle is engaged (phase 6). Throughout the entire duration of this phase, the signalling system 16 remains red.

When the target charging level for the energy storage device 200 is reached (phase 7), the end of charging detection unit 25 transmits an end of charging signal DC that is transmitted locally to the control and processing unit 22 within the vehicle V. This signal is also transmitted, via the wireless communication signal 13, 23, to the recharging station S. The signalling remains red, thus indicating to the driver that no driving is yet permitted at this stage. The end of charging information is displayed on the human-machine interface 26 of the vehicle V and is processed at the level of the station S by its control and processing unit 12, resulting in the deactivation of the power supply.

In an integrated management mode of the recharging process, reaching the set time limit leads to an automatic disconnection at the end of charging, with the disengagement of the moveable coupling arm.

In a driver-controlled mode, when informed of the end of the charging process, he can then actuate (phase 8) the "request to move" button on his remote control 21, which then emits an infra-red request to move signal SR that is received by the recharging station S via the infra-red receiver unit 18, then processed by the control and processing unit 12 in order to transmit a disconnection command CD signal to the actuation device 100.

The latter then starts the disengagement of the coupling arm 11 which leaves the coupling cone 28 (phase 9). During this phase 9 and the previous phase, the signalling remains red, as the moveable coupling arm is still deployed and premature driving would risk damaging the vehicle.

A time delay after disconnection is provided at the level of the vehicle: driving is prevented during this time, in order to ensure that the driver does not jump the lights.

When the moveable coupling arm 11 reaches the end of travel (phase 10) in the actuation device 100, an end of travel signal FC is transmitted by the end of travel detector 15, received and processed by the control and processing unit 12 which then transmits a signal to change to green, thus indicating to the driver that he can start the vehicle V moving again.

Apart from the solution involving manual intervention of the driver by using a remote control, other embodiments of the assistance method according to the invention can be envisaged, based on other control interfaces, or even automation of the methods.

Thus, the use of the remote control 21 can be replaced by an action by the driver on a dashboard or on a human-machine interface. This action can for example utilize a screen of the touch screen or contactless gesture recognition type.

Furthermore, the safety of the positioning method can be reinforced by providing for a mechanical and/or electrical locking system when the coupling arm is detected close to the receiving cone installed on the roof of the vehicle.

Other variant embodiments can also be envisaged, such as an embodiment implementing a simplification of the light codes, in order to facilitate understanding by the driver.

Of course, the invention is not limited to what has just been described, and many other embodiments than those that have just been described can be envisaged. Thus, the invention is not limited to particular configurations and geometries of the vehicles or the recharging stations. The vehicles can in particular combine different energy sources or different traction types. The recharging stations can also provide additional services over and above the recharging function.

The invention claimed is:

1. A method for assisting with positioning of an electric vehicle provided with energy storage means relative to a recharging station, the electric vehicle and the recharging station being arranged to form between them, a temporary electromechanical coupling allowing a transfer of electrical energy from the recharging station to the storage means, the method comprising:

detecting a positioning of said electric vehicle that is suitable for a temporary coupling;

transmitting a charging command to said recharging station, the processing of the charging command by said recharging station being conditional on said detecting of the positioning of said electric vehicle and controlling a temporary coupling then a transfer of energy; and said detecting the positioning of said electric vehicle comprises detecting the immobilization of said electric vehicle in a predetermined spatial position relative to the recharging station; and supplying electrical energy to said electric vehicle using a charging device, said charging device equipped with first electromechanical coupling means and means for actuating said first coupling means, and the electric vehicle comprising a device for receiving electrical energy equipped with second electromechanical coupling means, said first and second coupling means being coupled in such a way as to obtain a transfer of electrical energy from the recharging station to the electric vehicle, wherein the immobilization detection permits the reception of a charging command signal transmitted from the electric vehicle, the charging command signal thus being received and processed so as to generate a connection command that is applied to said actuation means;

detecting the end of charging of the electric vehicle, which causes an automatic disconnection of the first coupling means so that the temporary electromechanical coupling is terminated; and detecting the end of travel of the first coupling means during disconnection, said detection of the end of travel authorizing driving of the electric vehicle.

2. The method according to claim 1, wherein said detecting the end of charging of the electric vehicle includes allowing the reception of a driving command signal, the driving command signal thus received then being processed so as to generate a disconnection command that is applied to the actuation means.

3. The method according to claim 1, further comprising signalling of authorizing or not authorizing driving of the electric vehicle with respect to the recharging station, this signalling being changed as a function of the detections of immobilization, of end of charging and of end of travel.

4. The method according to claim 1, further comprising monitoring the driving of the electric vehicle as a function of one or more detections of immobilization, of end of charging and of end of travel.

5. The method according to claim 4, wherein monitoring the driving comprises a predetermined time delay of driving authorisation, starting from the detection of end of travel during disconnection.

6. A system for assisting with positioning of an electric vehicle provided with energy storage means relative to a recharging station, the electric vehicle and the recharging station being arranged to form between them, a temporary electromechanical coupling, allowing a transfer of electrical energy from the recharging station to the storage means, the system comprising:
means for detecting a positioning of said electric vehicle that is suitable for a temporary coupling, means for commanding a temporary electromechanical coupling and means for commanding a transfer of energy from said recharging station to the electric vehicle;
means for transmitting a charging command to said recharging station;
the implementation of said means for commanding a temporary electromechanical coupling and means for transferring energy being conditional on said detection of positioning;
within said recharging station, means for detecting immobilization of said electric vehicle in a predetermined spatial position relative to said recharging station and transmitting an immobilization information;
a device for supplying electrical energy equipped with first electromechanical coupling means and means for actuating said first coupling means, and the electric vehicle comprising a device for receiving electrical energy equipped with second electromechanical coupling means, said first and second means being arranged in order to be coupled in such a way as to obtain a transfer of electrical energy from said recharging station to the electric vehicle, said system also comprises means for receiving a charging command signal transmitted from said electric vehicle, and means for processing the immobilization information and said command signal thus received, so as to generate a connection command that is applied to said actuation means;
means for receiving an end-of-charging information of the electric vehicle, means for receiving a driving command signal transmitted from said electric vehicle, and means for processing said driving command signal thus received, so as to generate a disconnection command that is applied to said actuation means; and
means for detecting the end of travel of the first coupling means during disconnection, said detection of the end of travel authorizing driving of the electric vehicle.

7. The system according to claim 6, wherein the control means of a temporary electromechanical coupling are arranged to cause an automatic disconnection of the first coupling means in response to a detection of the end of charging of the electric vehicle.

8. The system according to claim 6, further comprising means for controlling the driving of the electric vehicle arranged in order to apply a predetermined time delay to the driving authorisation starting from the detection of the end of travel during disconnection.

9. The system according to claim 6, further comprising means for signalling the authorizing or not authorizing of the driving of the electric vehicle with respect to the recharging station, these signalling means being connected to the means for processing the information of immobilization, of end of charging and of end of travel.

10. A station for recharging an electric vehicle, the station comprising:
a device for supplying electrical energy, equipped with first electromechanical coupling means and means for actuating said first coupling means, said electric vehicle comprising a device for receiving electrical energy equipped with second mechanical coupling means, said first and second coupling means being arranged so as to be capable of being coupled in such a way as to obtain a transfer of electrical energy from said recharging station to said electric vehicle;
said recharging station also comprises means for detecting immobilization of said electric vehicle in a predetermined spatial position with respect to said recharging station; means for receiving a charging command signal transmitted from said electric vehicle;
means for processing said charging command signal so as to control, subject to immobilization, the actuation means of the first coupling means until said first coupling means enter into connection with said second coupling means; and
means for receiving an end of charging signal transmitted by transmission means within the electric vehicle, and means for processing said end of charging signal, so as to command the disconnection of the actuation means of the first coupling means until detection of an end of travel of said first coupling means transmitted by the end of travel detection means.

11. The station according to claim 10, wherein the control means of a temporary electromechanical coupling are arranged to cause an automatic disconnection of the first coupling means in response to a detection of the end of charging of the electric vehicle.

12. The station according to claim 10, further comprising means for signalling of authorizing or not authorizing of driving of the electric vehicle with respect to said recharging station, these signalling means being connected to the means for processing the information of immobilization, of end of charging and of end of travel information.

13. An electric vehicle provided to be recharged with electrical energy from a recharging station, the station comprising:
a device for supplying electrical energy, equipped with first electromechanical coupling means and actuation means for actuating said first coupling means,
a device for receiving electrical energy equipped with second mechanical coupling means, said first and second coupling means being configured to be coupled in such a way to transfer electrical energy from said recharging station to said electric vehicle,
means for detecting immobilization of said electric vehicle in a predetermined spatial position relative to said recharging station;

moveable means for detecting immobilization of said electric vehicle substantially in a predetermined spatial position with respect to said recharging station, said moveable means for detecting immobilization cooperating with static means for detecting immobilization connected to said recharging station so as to generate an immobilization information;

means for transmitting a charging command to said charging station;

means for receiving a charging command signal transmitted from said electric vehicle;

means for processing said charging command signal so as to control, subject to immobilization, the actuation means of the first coupling means until said first coupling means enter into connection with said second coupling means;

means for detecting an end of charging and generating an end of charging information;

means for transmitting said end of charging information to said recharging station;

means for receiving said end of charging signal transmitted by transmission means within the electric vehicle;

means for processing said end of charging signal, so as to command the disconnection of the actuation means of the first coupling means until detection of an end of travel of said first coupling means transmitted by the end of travel detection means; and means for transmitting a driving command to said recharging station.

14. The vehicle according to claim 13, wherein the moveable means for detecting immobilization comprise a retro-reflector provided in order to receive and reflect a light beam emitted by a photoelectric cell equipping the static means for detecting immobilization, said retro-reflector and said photoelectric cell being placed respectively on or in said electric vehicle and in said recharging station in such a way as to obtain a longitudinal immobilization detection substantially in a predetermined longitudinal position.

15. The vehicle according to claim 13, further comprising a driver's cab provided with a human-machine interface incorporating in particular the respective charging and driving commands, the respective status of these commands, and the respective immobilization and end of charging information.

16. The vehicle according to claim 13, further comprising means for receiving an end of travel information of the first coupling means, and means for controlling the driving of said electric vehicle, said driving control means being arranged in order to block said electric vehicle on station until said end of travel information has been received.

17. The vehicle according to claim 13, further comprising means for detecting a presence of the first coupling means, close to the second coupling means, and means for blocking the driving of said electric vehicle on station in response to a detection of presence by said detection means.

18. The vehicle according to claim 13, wherein the second electromechanical coupling means comprise a female coupling receiving cone, oriented substantially laterally with respect to the longitudinal axis of said electric vehicle and arranged in order to receive a male coupling part placed at the end of the first electromechanical coupling means connected to the recharging station.

\* \* \* \* \*